A. B. CARR.
VALVE.
APPLICATION FILED JUNE 28, 1920.

1,380,527.

Patented June 7, 1921.

Inventor
A. B. CARR

UNITED STATES PATENT OFFICE.

ALVA BRUCE CARR, OF BELLEVUE, ALBERTA, CANADA.

VALVE.

1,380,527.	Specification of Letters Patent.	Patented June 7, 1921.

Application filed June 28, 1920. Serial No. 392,269.

*To all whom it may concern:*

Be it known that I, ALVA BRUCE CARR, a citizen of the United States, residing at Bellevue, in the Province of Alberta, Canada, have invented certain new and useful Improvements in Valves, of which the following is a specification.

This invention relates to valves, and it comprises a valve casing, a valve seat arranged in the casing, a valve adapted to engage the seat, a valve stem therefor, a portion of said valve stem being threaded, an internally threaded sleeve arranged in the casing, the threads on said valve stem engaging said internal threads, said sleeve being normally stationary whereby rotation of the valve stem opens or closes the valve, and being arranged whereby it may be permitted to revolve with the valve stem to grind the valve and valve seat, a packing nut arranged on the valve stem, a seat formed on said nut, and a shoulder on said valve stem and adapted to engage said seat when the valve is opened; all as more fully hereinafter set forth and as claimed.

In the present invention, I have produced a valve which may be ground on its seat under pressure. It is not necessary in the present construction to remove the valve from the valve casing to grind it on the valve seat. The valve and valve stem are mounted in a sleeve having internal threads engaging external threads on a portion of the valve stem. Ordinarily the sleeve is stationary and rotation of the valve stem raises and lowers the valve on its seat. To grind the valve, it is merely necessary to loosen a packing nut which holds the sleeve in position, and when the nut is loosened, the valve stem may be turned, the sleeve turning with it so that the valve is held in contact with the valve seat. Sufficient pressure may be applied to the valve stem to properly grind the valve.

The invention further comprises the provision of a second seat in the packing nut and a sealing face or shoulder on the valve stem adapted to engage said seat when the valve is open, thus eliminating the necessity of packing between the valve stem and the nut.

In the accompanying drawings, I have shown one embodiment of the invention. In this showing, Figure 1 is a side elevation of the valve.

Figure 1:
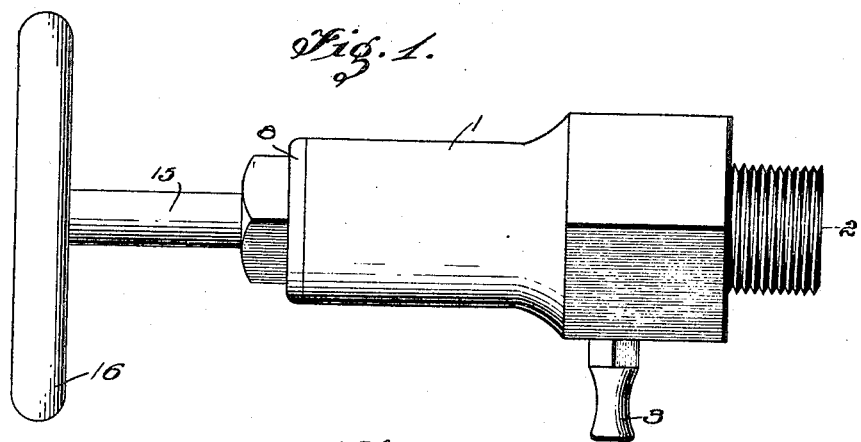
Figure 2:
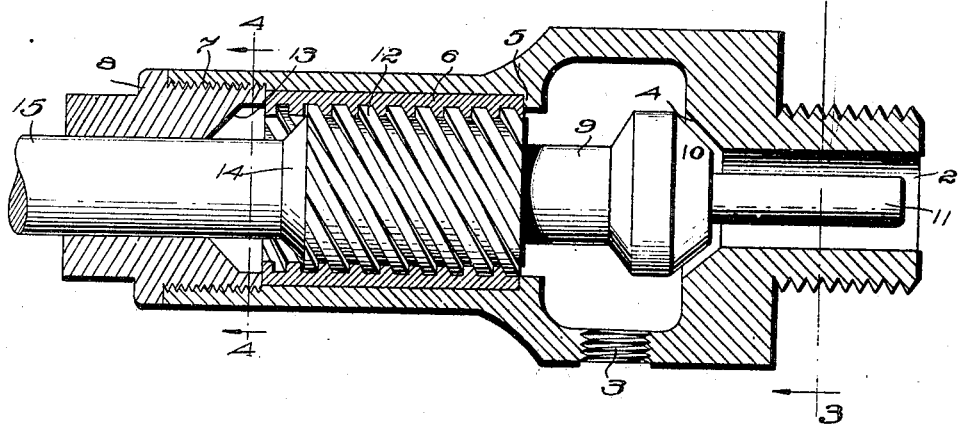
Fig. 2 is a longitudinal sectional view through the valve casing showing the valve and valve stem in elevation.
Figure 4:
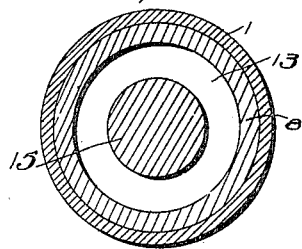
Fig. 4 is a similar view on the line 4—4 of Fig. 2.
Figure 3:
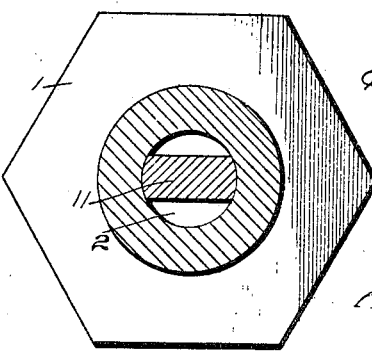
Fig. 3 is a transverse sectional view on the line 3—3 of Fig. 2.

Referring to the drawings, the reference numeral 1 designates the valve casing which is provided with an inlet 2 and an outlet 3. A valve seat 4 is arranged in the casing between the inlet and outlet. As shown, the seat is formed integral with the casing, but under some conditions, the valve seat may be made separate and properly mounted in the valve casing. Above the valve seat, the casing is provided with an annular shoulder 5 and a hollow internally threaded sleeve 6 is supported on this shoulder. The end of the valve casing is screw threaded, as at 7, and is adapted to receive a locking or packing nut 8, the inner end of which is adapted to engage the top of the threaded sleeve when the nut is tightened and retain the sleeve in position. A valve stem 9 is arranged in the casing, the valve stem being provided with a valve 10, adapted to seat upon the valve seat 4 to close the valve. A valve stem guide 11 may be arranged below the valve.

A portion of the valve stem is threaded as at 12 and is adapted to engage the internal threads of the hollow sleeve. The inner face of the nut 8 is provided with a conical seat 13 and the stem of the valve is reduced as at 14 to form a shoulder or sealing face adapted to engage this seat when the valve is opened. The end 15 of the valve stem passes through an opening in the nut 8 and it may be provided with any type of operating handle 16.

In operation, the parts are assembled, the nut 8 being tightened until it engages the top of the hollow sleeve 6 to hold the sleeve stationary. When the valve stem is rotated, the engaging threads on the valve stem and the stationary sleeve cause the stem to move horizontally of the valve casing and move the valve 10 toward or away from the seat 4 to open or close the valve. When the valve is opened, the face 14 engages the conical seat 13 to prevent leakage around the valve stem. It is, therefore, apparent that the use of packing around the valve stem is unnecessary with a construction of this character, thus simplifying the construction of the valve and eliminating a cause of constant annoyance.

To grind the valve, the nut 8 is loosened to permit free rotation of the sleeve with the valve stem. The valve 10 is then seated on the seat 4 and the valve stem rotated. Any desirable degree of pressure may be applied to the stem to properly grind the valve and the seat.

It is to be understood that while I have described the preferred embodiment of my invention, various changes in the shape, size, and arrangement of various parts may be resorted to without departing from the spirit of the invention or the scope of the subjoined claims.

What I claim is:

1. A valve comprising a casing, a valve seat arranged in the valve casing, an annular shoulder formed in the casing above the seat, an internally threaded cylindrical sleeve arranged thereon, means for securing said sleeve against rotation, a valve adapted to engage said valve seat, and a valve stem to which said valve is secured, a portion of said valve stem being threaded and adapted to engage the threads of said sleeve to permit opening and closing, said sleeve when released from said securing means being capable of rotation with said valve stem to grind said valve and valve seat, the sleeve securing means comprising a locking nut arranged in the end of the casing and surrounding the valve stem, said nut being adapted to engage the upper end of said sleeve to hold the sleeve stationary.

2. A valve comprising a casing, a valve seat arranged in the valve casing, an internally threaded cylindrical sleeve arranged in the casing above the valve seat, a valve adapted to engage said valve seat, a valve stem to which said valve is secured, a portion of said valve stem being threaded and adapted to engage the threads of said sleeve, a locking nut arranged in the end of the casing and surrounding the valve stem, said nut being adapted to engage the top of said sleeve to hold the sleeve stationary, a conical seat arranged on the inner face of said nut, the valve stem being provided with a sealing face adapted to engage said conical seat when the valve is in open position.

In testimony whereof I affix my signature in presence of two witnesses.

ALVA BRUCE CARR.

Witnesses:
   HELEN S. MORRISON,
   WILLIAM A. BEGG.